United States Patent
Byun et al.

(10) Patent No.: US 10,095,275 B2
(45) Date of Patent: Oct. 9, 2018

(54) BAND CONNECTING DEVICE AND HEAD MOUNTED DISPLAY INCLUDING THE SAME

(71) Applicant: Samsung Electronics Co., Ltd., Gyeonggi-do (KR)

(72) Inventors: Dong Hyun Byun, Gyeonggi-do (KR); Joong Kyung Park, Gyeonggi-do (KR); Tae Seuk Kang, Gyeonggi-d (KR); Sang Jin Wang, Gyeonggi-do (KR); Suk Jin Yun, Seoul (KR); Min Hwa Jeong, Gyeonggi-do (KR); Jin Hyeok Heo, Daegu (KR); Ji Seong Hwang, Gyeonggi-do (KR); Jong Chul Choi, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 54 days.

(21) Appl. No.: 15/274,829

(22) Filed: Sep. 23, 2016

(65) Prior Publication Data

US 2017/0090514 A1 Mar. 30, 2017

(30) Foreign Application Priority Data

Sep. 25, 2015 (KR) .......................... 10-2015-0136843

(51) Int. Cl.
*G09G 5/00* (2006.01)
*G06F 1/16* (2006.01)
*G06T 19/00* (2011.01)

(52) U.S. Cl.
CPC .............. *G06F 1/166* (2013.01); *G06F 1/163* (2013.01); *G06F 1/1681* (2013.01); *G06F 1/169* (2013.01); *G06F 1/1635* (2013.01); *G06F 1/1686* (2013.01); *G06F 1/1694* (2013.01); *G06F 1/1698* (2013.01); *G06T 19/006* (2013.01)

(58) Field of Classification Search
CPC ...... G06F 1/163; G06F 1/1681; G06F 1/1698; G06T 19/001; G02B 27/01; G02B 27/017; G02B 27/0176; G02B 2027/0154
See application file for complete search history.

(56) References Cited

U.S. PATENT DOCUMENTS

| 9,529,200 B2 * | 12/2016 | Thurber | G02B 27/64 |
| 9,839,166 B2 * | 12/2017 | Kim | H05K 7/20972 |
| 2010/0079356 A1 * | 4/2010 | Hoellwarth | G02B 27/017 345/8 |

(Continued)

FOREIGN PATENT DOCUMENTS

| KR | 10-1998-0084416 | 12/1998 |
| KR | 20-0254491 | 11/2001 |

*Primary Examiner* — Joe H Cheng
(74) *Attorney, Agent, or Firm* — The Farrell Law Firm, P.C.

(57) ABSTRACT

A head mounted display device is provided. A head mounted display device includes a main frame including surface formed to face a facial side of a user and an opposite surface on which an external electronic device is mounted; a connecting device connected to the main frame; and a support part connected to the connecting device that fixes the head mounted display device to the facial side of the user. At least a portion of a surface of the connecting device, which is connected to the support part, forms an angle with a direction in which the main frame faces the facial side of the user.

20 Claims, 19 Drawing Sheets

(56) References Cited

U.S. PATENT DOCUMENTS

| | | | |
|---|---|---|---|
| 2010/0277575 A1* | 11/2010 | Ismael | G02B 27/2242 |
| | | | 348/53 |
| 2015/0138645 A1 | 5/2015 | Yoo et al. | |
| 2015/0234192 A1* | 8/2015 | Lyons | G02B 27/0172 |
| | | | 345/8 |
| 2016/0004085 A1* | 1/2016 | Stroetmann | G02B 27/017 |
| | | | 345/8 |
| 2016/0011425 A1* | 1/2016 | Thurber | G02B 27/64 |
| | | | 345/8 |
| 2016/0019720 A1* | 1/2016 | Thurber | G02B 27/0172 |
| | | | 345/419 |
| 2016/0062125 A1* | 3/2016 | Baek | G02B 27/0176 |
| | | | 361/679.01 |
| 2016/0224176 A1* | 8/2016 | Kim | G06F 3/0416 |
| 2017/0153672 A1* | 6/2017 | Shin | G06F 1/163 |

\* cited by examiner

PIP mode

See-through mode

BAND CONNECTING DEVICE AND HEAD MOUNTED DISPLAY INCLUDING THE SAME

PRIORITY

This application claims priority under 35 U.S.C. § 119(a) to Korean Patent Application Serial No. 10-2015-0136843, which was filed in the Korean Intellectual Property Office on Sep. 25, 2015, the entire disclosure of which is incorporated herein by reference.

BACKGROUND

1. Field of the Disclosure

The present disclosure relates generally to a band connecting device, and more particularly, to a head mounted display device including the band connecting device.

2. Related Art

Wearable electronic devices that may be directly mounted (e.g., worn) on the human body are available. Because these wearable electronic devices may be mounted on a portion of the human body, e.g., a wrist, an ankle, the neck, the waist, or the head of the user, mobility and portability can be improved. For example, a head mounted display (HMD) device is worn on the head of the user to display an image and may include a support part, such as a band, to hold the HMD on the head of the user.

When being mounted, the head mounted display device may include a part situated on an upper portion of the wearer and/or a part situated at a side of the head. The part situated at an upper portion of the head (e.g., a top band) may support the head mounted display device such that the head mounted display device does not slide from the head of the wearer, and the part situated at a side of the head (e.g., a side band) may fasten the head mounted display device such that the head mounted display device is adhered to the facial side of the user.

However, the part of the support part, which is situated at an upper portion of the head of the wearer may press the head of the wearer, causing an uncomfortable feeling when worn. Further, a weight applied to the facial side of the wearer may increase due to the weight of the part situated at an upper portion of the head of the wearer. Accordingly, the part situated at an upper portion of the wearer may be excluded from the support part.

However, when the part situated at an upper portion of the head of the wearer is excluded from the support part and the support part only includes the part situated at a side of the head of the wearer, the part situated at a side of the head of the wearer may be supported by the head of the user by a resilient force (or a rotational force) such that the head mounted display device is fixed to the facial side of the user. Accordingly, a weight applied to the facial side of the wearer may be increased by an increased resilient force. Further, a weight may be concentrated on a specific portion (for example, the user's nose or cheek bones) by a resilient force generated at the side of the head of the wearer.

SUMMARY

Accordingly the present disclosure is made to address at least the above-mentioned problems and/or disadvantages and to provide at least the advantages described below.

An aspect of the present disclosure is to provide a connecting device for an HMD that disperses weight applied to the facial side of the user.

Another aspect of the present disclosure is to provide an HMD including a connecting device that disperses weight of the AMD applied to the facial side of the user, when worn.

In accordance with an aspect of the present disclosure, a head mounted display device is provided, which includes a main frame including surface formed to face a facial side of a user and an opposite surface on which an external electronic device is mounted; a connecting device connected to the main frame; and a support part connected to the connecting device that fixes the head mounted display device to the facial side of the user. At least a portion of a surface of the connecting device, which is connected to the support part, forms an angle with a direction in which the main frame faces the facial side of the user.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
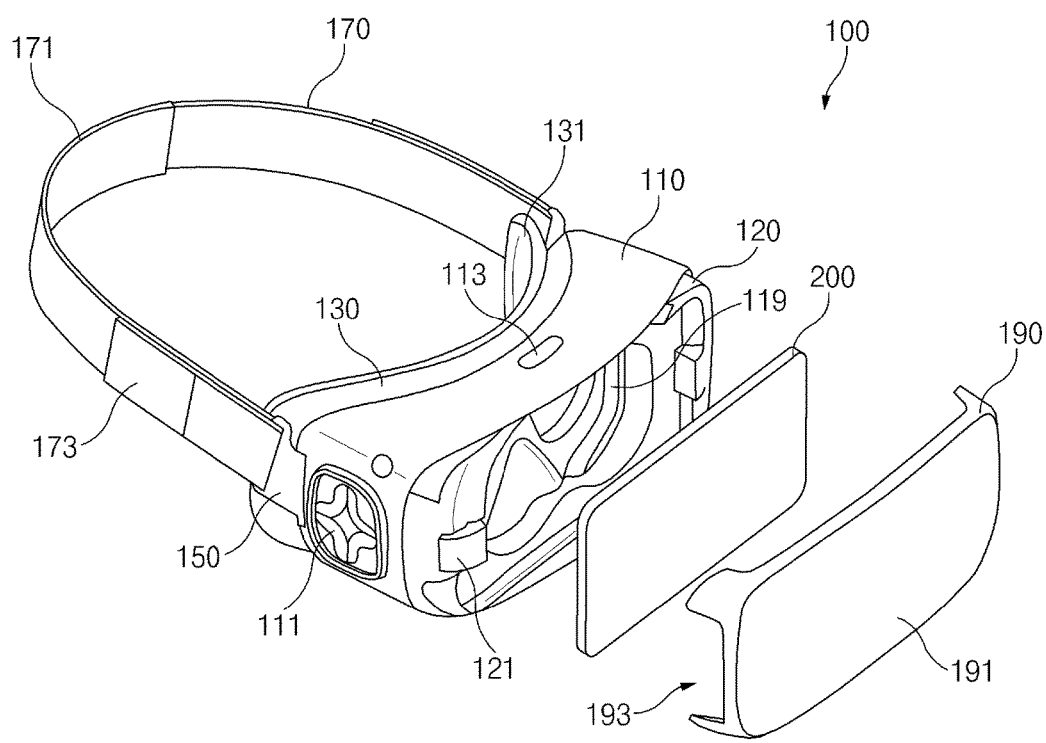
FIG. 1 illustrates a head mounted display device according to an embodiment of the present disclosure.
Figure 2:
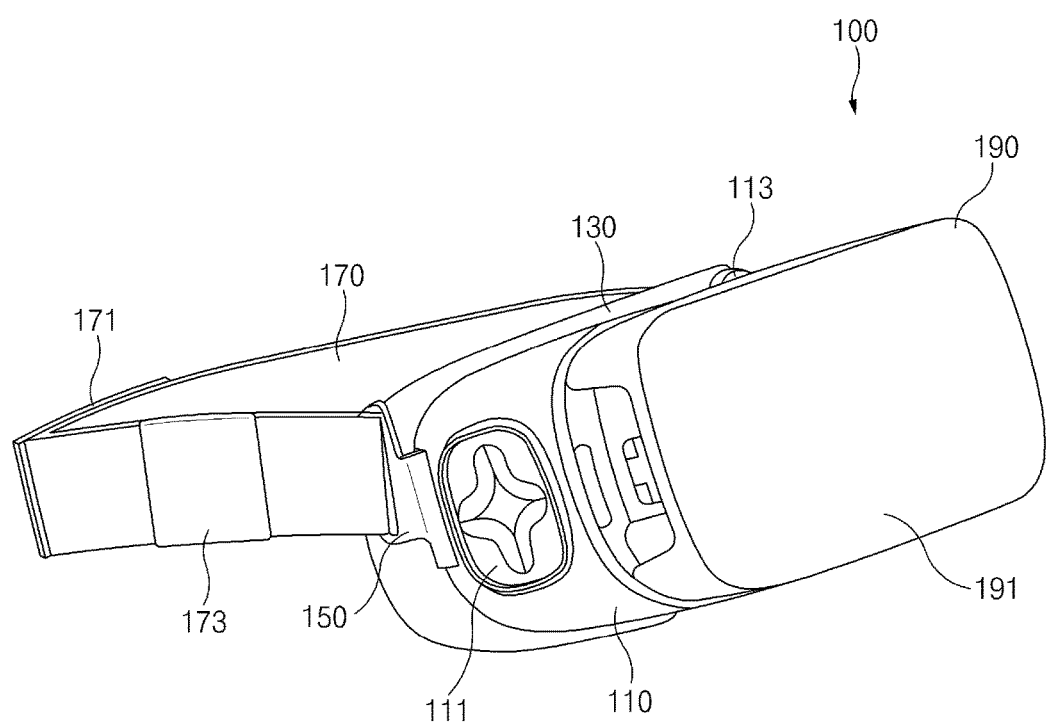
FIG. 2 illustrates a head mounted display device coupled to an external electronic device according to an embodiment of the present disclosure.
Figure 3:
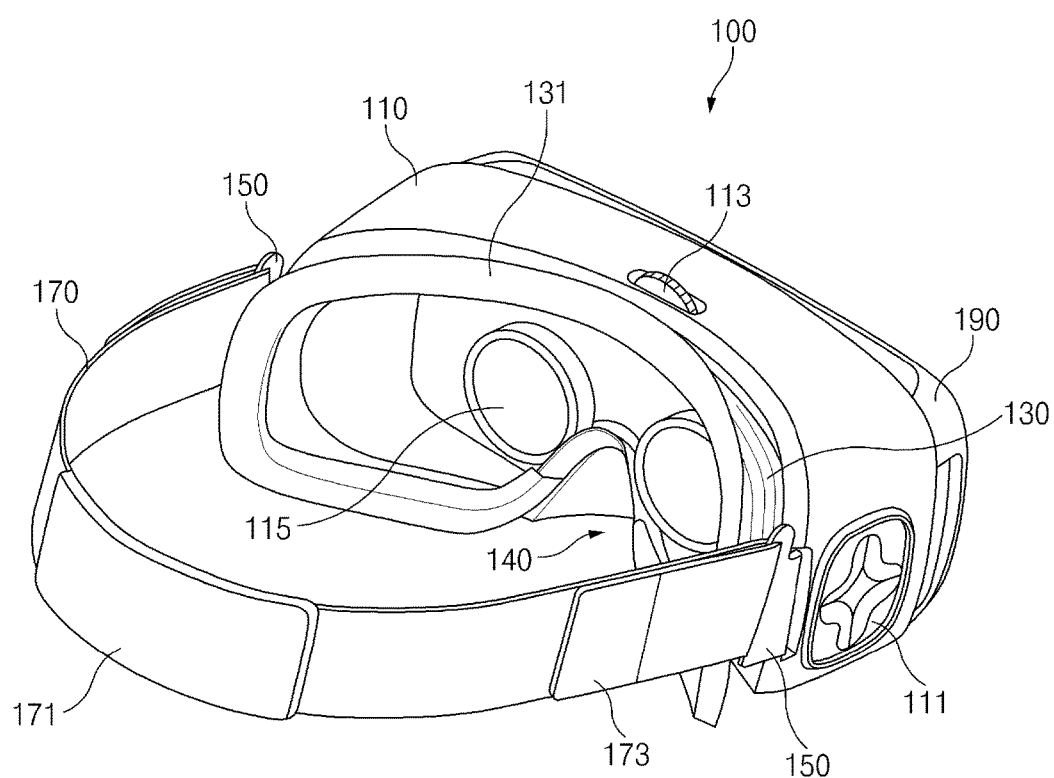
FIG. 3 illustrates a head mounted display device coupled to an external electronic device according to an embodiment of the present disclosure.
Figure 4:
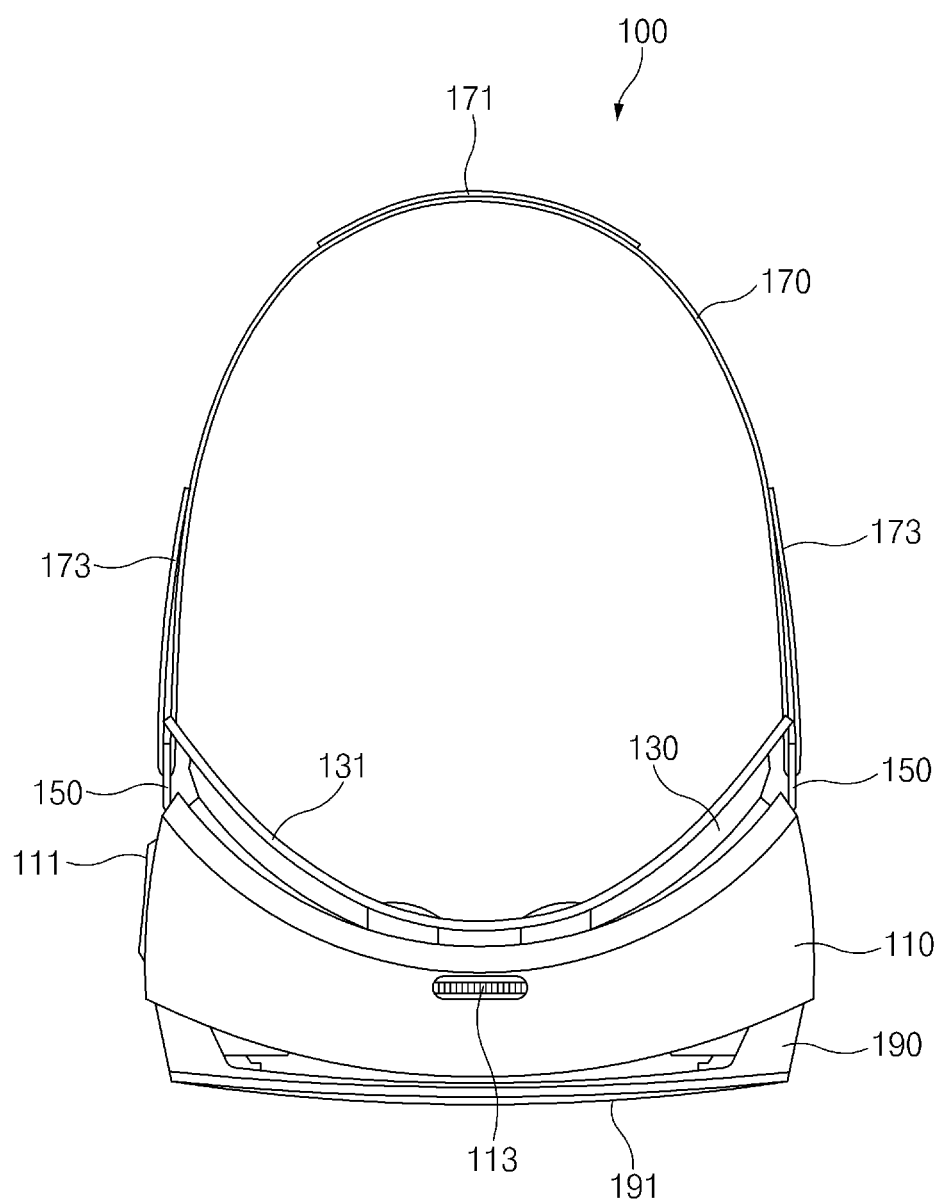
FIG. 4 illustrates a head mounted display device coupled to an external electronic device according to an embodiment of the present disclosure.
Figure 5A:
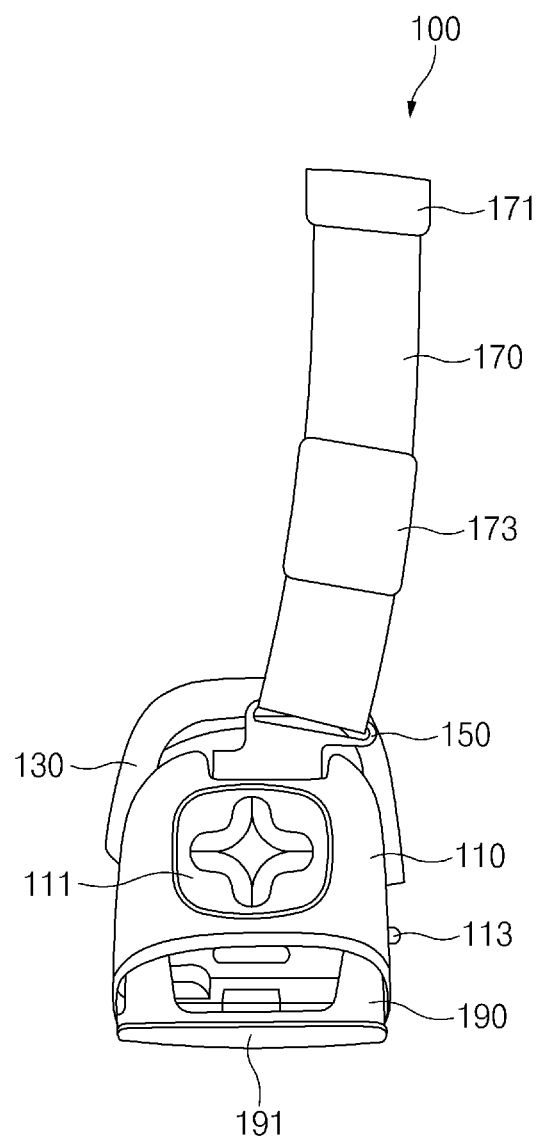
FIG. 5A illustrates a head mounted display device coupled to an external electronic device according to an embodiment of the present disclosure.
Figure 5B:
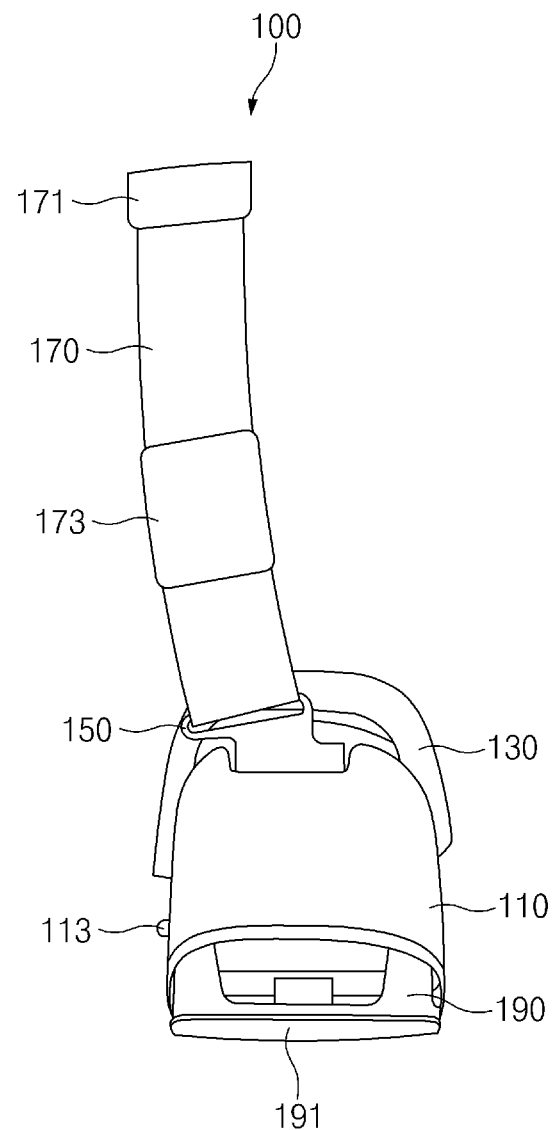
FIG. 5B illustrates a head mounted display device coupled to an external electronic device according to an embodiment of the present disclosure.

Hereinafter, various embodiments of the present disclosure are disclosed with reference to the accompanying drawings. However, the present disclosure is not intended to be limited by the various embodiments described herein and it is intended that the present disclosure covers all modifications, equivalents, and/or alternatives of the present disclosure provided they come within the scope of the appended claims and their equivalents.

With respect to the descriptions of the accompanying drawings, like reference numerals refer to like elements.

All terms used herein may have the same meanings that are generally understood by a person skilled in the art. In general, terms defined in a dictionary should be considered to have the same meanings as the contextual meanings of the related art, and unless clearly defined as such herein, should not be understood differently or as having an excessively formal meaning. In any case, even terms defined in the present specification are not intended to be interpreted as excluding embodiments of the present disclosure.

Terms and words used in the following description and claims are also not limited to the bibliographical meanings, but are merely used to provide a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

Singular forms such as "a," "an," and "the" include plural referents unless the context clearly dictates otherwise. Thus, for example, reference to "a component surface" includes reference to one or more of such surfaces.

Terms such as "include," "comprise," "have", "may include," "may comprise" and "may have" indicate recited functions, operations, or existence of elements, but do not exclude other functions, operations, or elements.

For example, the expressions "A or B," or "at least one of A and/or B" may indicate A and B, A, or B.

Terms such as "1st," "2nd," "first," "second," etc., may modify different elements, but are not intended to limit the elements. For instance, "a first user device" and "a second user device" may indicate different users regardless of order or importance. Accordingly, a first component may be referred to as a second component, and vice versa, without departing from the scope and spirit of the present disclosure.

When a component (e.g., a first component) is referred to as being "operatively or communicatively coupled with/to" or "connected to" another component (e.g., a second component), the first component may be directly connected to the second component or may be connected through another component (e.g., a third component). However, when the first component is referred to as being "directly connected to" or "directly accessed by" the second component, no other component exists therebetween.

The expression "configured to" may be interchangeably used with "suitable for," "having the capacity to," "designed to," "adapted to," "made to," or "capable of" according to context.

The term "configured to" may not necessarily indicate "specifically designed to" in terms of hardware. Instead, the expression "a device configured to" in some situations may indicate that the device and another device or part are "capable of" For example, "a processor configured to perform A, B, and C" may indicate a dedicated processor (e.g., an embedded processor) for performing a corresponding operation or a general purpose processor (e.g., a central processing unit (CPU) or application processor (AP)) for performing corresponding operations by executing at least one software program stored in a memory device.

An electronic device may include a smartphone, a tablet personal computer (PC), a mobile phone, a video telephone, an electronic book reader, a desktop PC, a laptop PC, a netbook computer, a workstation, a server, a personal digital assistant (PDA), a portable multimedia player (PMP), a Motion Picture Experts Group (MPEG-1 or MPEG-2) Audio Layer 3 (MP3) player, a mobile medical device, a camera, or a wearable device. The wearable device may include at least one of an accessory-type device (e.g., a watch, a ring, a bracelet, an anklet, a necklace, glasses, a contact lens, an HMD), a textile- or clothing-integrated-type device (e.g., electronic apparel), a body-attached-type device (e.g., a skin pad or a tattoo), or a bio-implantable-type device (e.g., an implantable circuit)

An electronic device may also be a home appliance such as a television (TV), a digital video/versatile disc (DVD) player, an audio, a refrigerator, an air conditioner, a cleaner, an oven, a microwave oven, a washing machine, an air cleaner, a set-top box, a home automation control panel, a security control panel, a television (TV) box (e.g., Samsung HomeSync®, Apple TV®, or Google TV®), a game console (e.g., Xbox® or PlayStation®), an electronic dictionary, an electronic key, a camcorder, or an electronic picture frame An electronic device may also include various medical devices (e.g., various portable medical measurement devices (e.g., a blood glucose measuring device, a heart rate measuring device, a blood pressure measuring device, a body temperature measuring device, etc.), a magnetic resonance angiography (MRA), a magnetic resonance imaging (MRI), a computed tomography (CT), a scanner, an ultrasonic device, etc.), a navigation device, a global navigation satellite system (GNSS), an event data recorder (EDR), a flight data recorder (FDR), a vehicle infotainment device, electronic equipment for vessels (e.g., a navigation system, a gyrocompass, etc.), avionics, a security device, a head unit for a vehicle, an industrial or home robot, an automatic teller machine (ATM), a point of sales (POS) device, or an Internet of things (IoT) device (e.g., a light bulb, various sensors, an electric or gas meter, a sprinkler, a fire alarm, a thermostat, a streetlamp, a toaster, exercise equipment, a hot water tank, a heater, a boiler, etc.).

An electronic device may also include a part of furniture and/or a building/structure, an electronic board, an electronic signature receiving device, a projector, or a measuring instrument (e.g., a water meter, an electricity meter, a gas meter, a wave meter, etc.).

An electronic device may also be a flexible device.

An electronic device may also be a combination of any of the above-mentioned devices.

An electronic device, however, is not limited to the above-mentioned devices, and may include new electronic devices with the development of new technology.

Herein, the term "user" may refer to a person who uses an electronic device or may refer to a device (e.g., an artificial intelligence (AI) electronic device) that uses an electronic device.

FIG. 1 illustrates a head mounted display device according to an embodiment of the present disclosure, and FIGS. 2, 3, 4, 5A, and 5B illustrate a head mounted display device coupled to an external electronic device according to an embodiment of the present disclosure.

Referring to FIGS. 1 to 5B, a head mounted display device 100 includes a main frame 110 and a support part 170 (e.g., a goggle band).

The main frame 110 may be mounted on at least a portion of the face of the user (e.g., a facial side), and may be supported on the facial side of the user by using various elements. The main frame 110 may be formed of a material, such as a plastic material, which is light enough to allow the user to feel comfortable and may support an external electronic device 200. Further, the main frame 110 may include a material for protecting the head mounted display device 100.

The protective material may include different materials, such as glass, plastic (e.g., acrylonitrile butadiene styrene (ABS) or polycarbonate), ceramics, metal (e.g., aluminum), or metal alloy (e.g., steel, stainless steel, titanium, or a magnesium alloy), for securing strength or an external appearance.

The main frame 110 includes an input part 111, a display positioning part 113, and a lens fixing part 119. A front case 120 including a space or a structure, to which the external electronic device 200 may be coupled, is formed on a front surface of the main frame 110.

The input part 111 may include a control unit or a user input module that may control the external electronic device 200. The input part 111 is arranged on a side surface of the main frame 110, and may include at least one of a touch pad, a physical key, a physical button, a touch key, a joystick, a wheel, etc. The input part 111 may provide a graphic user interface (GUI) that may control a function of the external electronic device 200. For example, a volume of audio that is output from the external electronic device 200 may be adjusted through a GUI for setting sound, and an image that is displayed by the external electronic device 200 may be controlled through a GUI for reproduction of an image. Further, the input part 111 may receive a touch input or a hovering input by the user.

The display positioning part 113 may have a form of a wheel or a dial. If the user turns the wheel or the dial implemented as the display positioning part 113, the external electronic device 200 is moved such that a distance between a display of the external electronic device 200 and the user may be adjusted. As a result, the user may watch an image that is suitable for his or her sight or optimally displayed, by adjusting a position of the external electronic device 200. For example, if the user manipulates the display positioning part 113, the head mounted display device 100 may move the external electronic device 200 close to or far away from the user. The front case 120 may be moved if the display positioning part 113 is manipulated.

The lens fixing part 119 fixes a lens 115. A display or the transparent/translucent lens 115 may be fixed to the lens fixing part 119 integrally or detachably. A lens assembly may be inserted between the display and the eyes of the user.

The front case 120 may correspond to an external appearance of the external electronic device 200. The front case 120 may be formed of a resilient material or a flexible material to be deformed, and accordingly, an electronic device 200 of various sizes may be received. The front case 120 may fix the external electronic device 200 between the front case 120 and the cover 190. The front case 120 may include a first fixing part that may support the cover 190 and a second fixing part that may fix the external electronic device 200. For example, the front case 120 includes a coupling part 121, which fixes the external electronic device 200.

The main frame 110 may further include a connector to communicate with the external electronic device 200 that has been coupled thereto. The connector may include a universal serial bus (USB) connector that may be connected to an electrical connection part of the external electronic device 200, for example, a USB port, and a signal of a GUI provided by the input part 111 may be transferred to the external electronic device 200 through the electrical connection part of the USB connector. Further, the connector may transfer a touch input or a hovering input received through the input part 111 to the external electronic device 200. In this case, the external electronic device 200 may control a function corresponding to a touch input or a hovering input received from the head mounted display device 100 in response to the touch input or the hovering input. For example, the external electronic device 200 may adjust a volume or control reproduction of an image in response to the received touch input or hovering input. The connector may be included in the coupling part 121.

The head mounted display device 100 furthers include a cover 190 that supports the external electronic device 200 on the main frame 110 more firmly while the external electronic device 200 is coupled to the main frame 110. The cover 190 may be physically coupled to the main frame 110 in the form of a hook or in a manner using, e.g., a magnet or an electromagnet. Accordingly, the cover 190 may additionally prevent the external electronic device 200 from being separated from the main frame 110, and may improve an aesthetic aspect while constituting an external appearance of the main frame 110.

The cover 190 further includes a window 191 on a front surface thereof. The window 191 may function to improve an aesthetic aspect through various materials and various colors. The window 191 may be manufactured of a general plastic material such as polycarbonate or acryl, may be manufactured of a ceramic material such as glass, sapphire, or transparent ceramic, and may be manufactured of a metal material such as aluminum or stainless steel.

When the window 191 is formed of a transparent material, it may include a color or a transparency of the window 191 may be adjusted.

Further, the cover 190 includes one or more openings 193. The opening 193 may easily discharge heat generated by the external electronic device 200 to the outside of the cover 190, and through this, the performance of the external electronic device 200 may be prevented from being lowered, by lowering the temperature of the external electronic device 200. The weight of the cover 190 may be made lighter due to existence of the one or more openings 193 so that the entire weight of the head mounted display device 100 may be reduced, which is helpful for weight lightening.

The rear surface of the main frame 110 is a part that contacts a facial side of the user (hereinafter, a facial side contact part 130), and may have a structure corresponding to the curve of the facial side and may include a resilient body 131 in at least an area thereof.

The resilient body 131 may be formed of at least one cushion such as a sponge such that a comfortable feeding may be provided to the user when the facial side contact part 130 is in contact with the facial side of the user. The resilient body 131 may include one sponge, or may be one in which one or more sponges having different compressibility are combined. For example, the resilient body 131 is a sponge in which three layers (e.g., an upper layer, an intermediate layer, and a lower layer) are combined, wherein the upper and lower layers may be formed of a sponge of a low compressibility and the intermediate layer may be formed of a sponge of a high compressibility.

The resilient body 131 may be detachably mounted on the main frame 110. A bonding member may be situated on one surface of the resilient body 131, and the surface of the resilient body 131 may be attached to the main frame 110 through a bonding member. For example, the bonding member may be Velcro, tape, or an adhesive.

When one head mounted display device 100 is used by several users, resilient members 131 suitable for the users (e.g., suitable for adults and children having different facial contours) may be used. Further, when a surface of the resilient member 131 is contaminated (e.g., contaminated by cosmetics) or the resilient body 131 comes to be discarded due to frequent uses thereof, the resilient member 131 may be replaced such that the head mounted display device 100 may continue to be used.

The head mounted display device 100 may be easily mounted on the facial side of the user. For example, the main frame 110 may have an external appearance that covers the eyes of the user, and includes a nose recess 140 such that the nose of the user may be situated in the nose recess 140.

A lens assembly including at least one lens may be inserted into the facial side contact part 130 at a location corresponding to the eyes of the user. Further, when the user wears the head mounted display device 100, at least one surface of the lens 115 may be exposed to the facial side contact part 130 such that a screen of the display may be viewed by the eyes of the user.

The support part 170 may be coupled to a portion of the main frame 110 such that the user may wear the head mounted display device 100, and thus, the main frame 110 may be supported on the facial side of the user. The support part 170 may include a band at least a portion of which is formed of a resilient material. The length of the resilient band of the support part 170 may be adjusted such that the main frame 110 may be adhered to the vicinity of the eyes of the facial side of the user.

The support part 170 may include a support 171 and a length adjusting part 173. The support 171 may be configured such that the band supports the rear head of the user. The support 171 may include cushions to provide a comfortable wearing feeling in consideration of long-time use thereof.

The length adjusting part 173 may function to adjust the length of the band such that the band is suitable for the circumference of the head of the user. The length adjusting part 173 may include Velcro or a magnet. Additionally or alternatively, the support part 170 may include eyeglass temples, a helmet, a strap, etc.

A connecting device 150 (or a band connecting device) connects the main frame 110 and the support part 170. The connecting device 150 may be arranged on one surface (e.g., a side surface) of the main frame 110, and may be attached and detached to and from the main frame 110. For example, a portion of the connecting device 150 may be provided in a form of a hook to be connected to a hinge shaft arranged on one surface of the main frame 110.

The connecting device 150 may be configured such that the support part 170 supporting the head of the user while being inclined from the rear surface of the main frame 110 towards the upper surface of the main frame 110 by a specific angle. Accordingly, if the user wears the head mounted display device 100, a weight applied to the facial side of the user is reduced and a weight applied to a specific portion (e.g., the user's nose or cheek bones) may be dispersed.

Figure 6A:
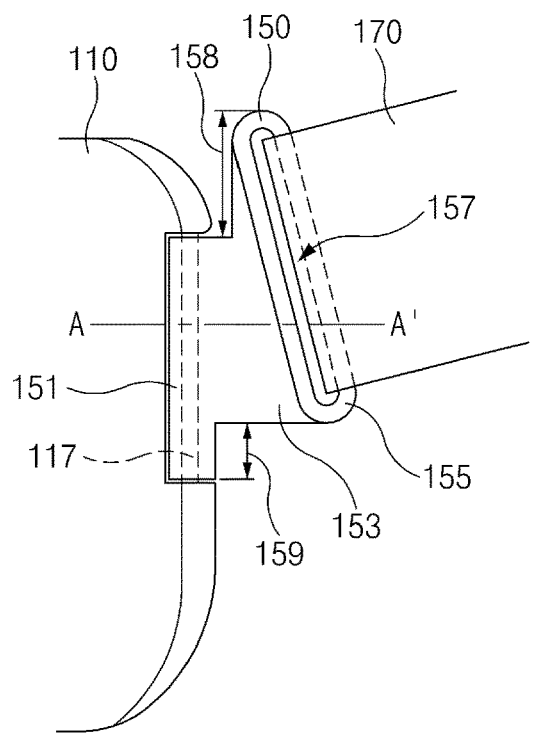
FIG. 6A illustrates a portion of a head mounted display device on which a connecting device is arranged according to an embodiment of the present disclosure.
Figure 6B:
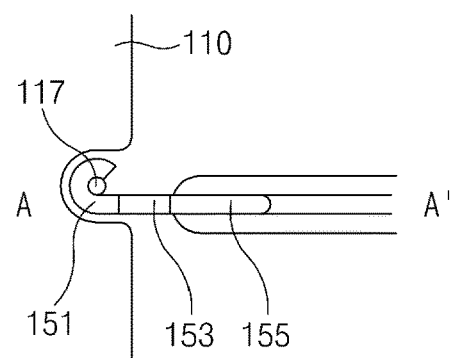
FIG. 6B illustrates a portion of a cutaway surface taken along line A-A' of FIG. 6A according to an embodiment of the present disclosure.
Figure 6C:
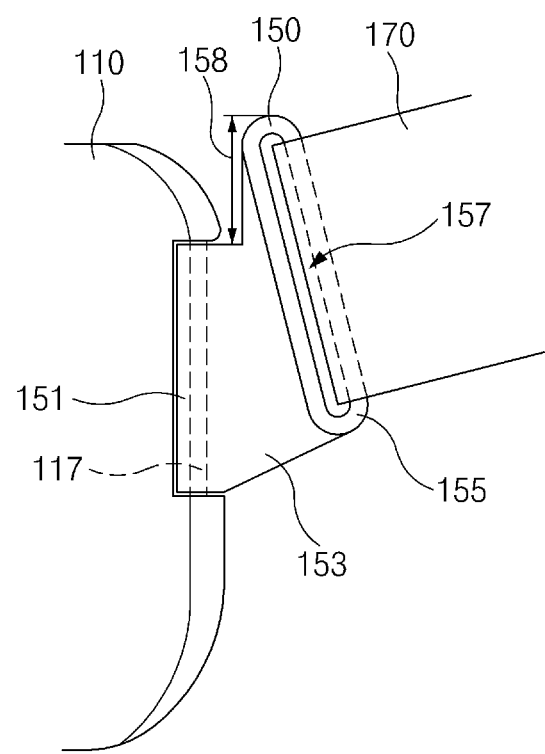
FIG. 6C illustrates a connecting device illustrated in FIG. 6A according to an embodiment of the present disclosure.

FIGS. 6A to 6C illustrate a connecting device included in a head mounted display device according to an embodiment of the present disclosure.

Specifically, FIG. 6A illustrates a portion of a head mounted display device 100 in which a connecting device 150 is arranged, FIG. 6B illustrates a portion of a cutaway surface taken along line A-A' of FIG. 6A, and FIG. 6C illustrates another form of the connecting device 150 illustrated in FIG. 6A.

Referring to FIGS. 6A to 6C, the main frame 110 of the head mounted display device 100 includes a hinge shaft 117 in which the connecting device 150 is connected to one surface (e.g., a side surface) thereof. The hinge shaft 117 may be arranged inside a cavity formed on one surface of the main frame 110, and opposite ends of the hinge shaft 117 may be connected to parts of the main frame 110 corresponding opposite surfaces of the cavity. In this case, an opposite surface of the main frame 110 to which the hinge shaft 117 is not connected may be spaced apart from the hinge shaft 117 by a specific distance, and the connecting device 150 may be inserted through the space to be connected to the hinge shaft 117.

The connecting device 150 includes a hinge 151 that is connected to a hinge shaft 117, an extension 153 that extends from one surface of the hinge 151, and a connector 155 to which the support part 170 is connected. The hinge 151 is connected to the hinge shaft 117 to such that the connecting device 150 may be hinged. A portion of one surface of the hinge 151, which is opposite to a surface of the hinge 151 from which the extension 153 extends, may have a form of a hook and may be connected to the hinge shaft 117. Accordingly, the connecting device 150 connected to the hinge shaft 117 may be hinged within a specific range in a direction that is perpendicular to an axial direction of the hinge shaft 117.

The support part 170 connected to the connecting device 150 may surround the head of the user regardless of a circumference of the head of the user through a hinge operation of the connecting device 150. In some embodiments, the hinge 151 may be provided integrally with the hinge shaft 117.

The extension 153 extends from at least a portion of one surface of the hinge 151 to be connected to the connector 155. A surface of the hinge 151 from which the extension 153 extends may extend from an upper end of the hinge 151 towards an upper surface of the main frame 110 by a first size 158. Accordingly, the surface of the extension 153 to which the connector 155 is connected may be long enough to secure a size corresponding to the first size 158, and the width of the support part 170 connected to the connector 155 is also large enough to correspond to the size so that a wearing feeling may be increased when the user wears the head mounted display device 100.

A surface of the hinge 151 from which the extension 153 extends may extend upwards from a lower end of the hinge 151 towards an upper surface of the main frame 110 by a second size 159. Accordingly, a lower end of the connector 155, which is connected to the extension 153, may extend upwards towards the upper surface of the main frame 110 by a size that is similar to or the same as the second size 159. Accordingly, the support part 170 connected to the connector 155 also surrounds the head of the user from the upper side by a size that is similar to or the same as the second size 159, thereby preventing a specific portion (e.g., an ear) of the user from being stopped or covered by the support part 170.

Unlike FIG. 6A, wherein the surface of the hinge 151 from which the extension 153 extends upwards from a lower end of the hinge 151 towards an upper surface of the main frame 110 by the second size 159, the lower surface of the extension 153 may extends from a lower end of the hinge 151 to a lower end of the connector 155 while being inclined at a specific inclination as illustrated in FIG. 6C.

At least a portion of the surface of the extension 153, which is connected to the connector 155 may be inclined such that the connector 155 is inclined from the rear surface of the main frame 110 towards the upper surface of the main frame 110 by a specific angle (e.g., inclined from a direction that is perpendicular to the axial direction of the hinge shaft 117 by a specific angle).

The connector 155 includes a hole (or an opening) 157 such that the support part 170 may be connected to the connector 155. The hole 157 may have a specific length and a specific width, and may be surrounded by a periphery of the connector 155. An opening/closing part may be formed at a peripheral portion of the connector 155. For example, the opening/closing part may connect the support part 170 to the connector 155 when a peripheral portion of the connector 155 is opened, and may prevent the support part 170 from being separated from the connector 155 when the peripheral portion of the connector 155 is closed. The length and the width of the hole 157 may correspond to the width and the thickness of the support part 170. Accordingly, if the length and the width of the hole 157 correspond to the width and the thickness of the support part 170, a surface of the support part 170 may be inserted into the hole 157.

The hole 157 formed in the connector 155 may be configured such that an axis in a lengthwise direction (e.g., a direction of a surface to which the support part 170 is connected) corresponding to the width of the support part 170 forms a specific angle with the rear surface of the main frame 110. For example, an angle between a line extending from an upper end (e.g., a part that is adjacent to an upper end of the main frame 110) to a lower end (e.g., a part that is adjacent to a lower end of the main frame 110) of the hole 150 and a vertical direction (e.g., a direction of the hinge shaft 117) may be a specific angle or an inclination (e.g., an astute angle of not less than 0 degrees and not more than 90 degrees). Accordingly, the support part 170 inserted into the hole 157 may be inclined towards the upper surface of the main frame 110 by a specific angle to support the head of the user. When the support part 170 is inclined towards the upper surface of the main frame 110 by a specific angle to support the head of the user, a weight applied to the facial side of the user may be decreased and a weight biased to a specific portion of the facial side may be dispersed as compared with the support part 170 that is not inclined.

Figure 7:
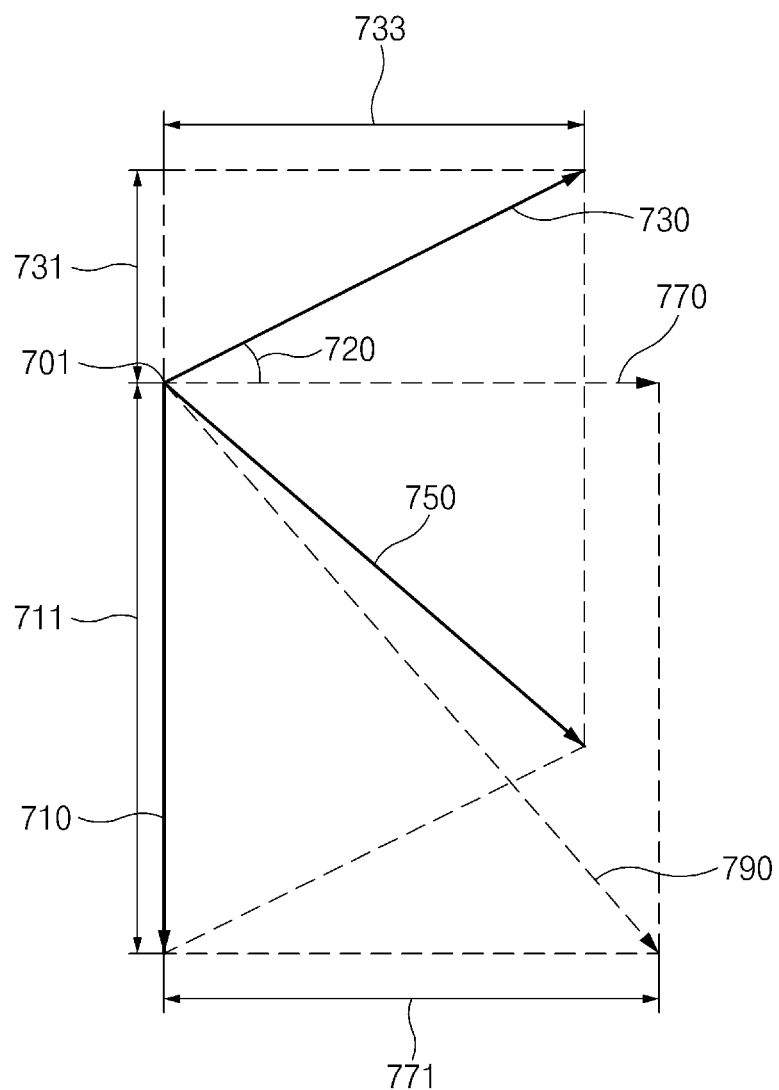
FIG. 7 illustrates a weight applied to the facial side of the wearer according to an embodiment of the present disclosure.

FIG. 7 illustrates a weight applied to a facial side of a wearer according to an embodiment of the present disclosure.

Referring to FIG. 7, when the support part 170 of the head mounted display device 100 supports the head of the user towards the rear surface of the main frame 110, a first weight 790 of the head mounted display device 100 at one point 701 may include a vertical weight 710 that is formed by the weight of the head mounted display device 100 and a horizontal weight that is formed by a first tension 770 that supports the head of the user through the support part 170.

If the support part 170 is inclined from the rear surface of the main frame 110 towards the upper surface of the main frame 110 by a specific angle 720, a second weight 750 at one point 701 of the head mounted display device 100 may be changed by a second tension 730 a direction of which is changed to the upper side by a specific angle 720. For example, a magnitude 711 of the vertical weight 710 may be decreased by a magnitude 731 of the vertical component of the second tension 730. Further, because a magnitude 733 of a horizontal component of the second tension 730 is smaller than the magnitude 771 of the first tension 770, the magnitude of the horizontal weight also may decrease. Accordingly, the entire weight at the point 701 of the head mounted display device 100 may decrease.

Although FIG. 7 illustrates the second tension 730 has the same magnitude as that of the first tension 770, the second tension 730 may have different magnitudes according to the shapes of the heads of the users. For example, the second tension 730 may be higher than the first tension 770 such that a magnitude 733 of a horizontal component of the second tension 730 is the same as or similar to a magnitude 771 of the first tension 770. However, because the length of the support part 170 corresponds to a length for surrounding the head of the user, a change in the magnitude of the horizontal component due to a change in the direction of the tension may be very small.

Because the second tension 730 may be applied towards the upper surface of the main frame 110, biasing of a weight applied to the facial side of the user by the first tension 770 to a specific portion, e.g., the nose or cheek bone may be attenuated. For example, a weight at the nose or cheek bone may be decreased in proportional to the magnitude 731 of the vertical component of the second tension 730 and the weight may be dispersed to the forehead or eyebrow of the user.

Figure 8:
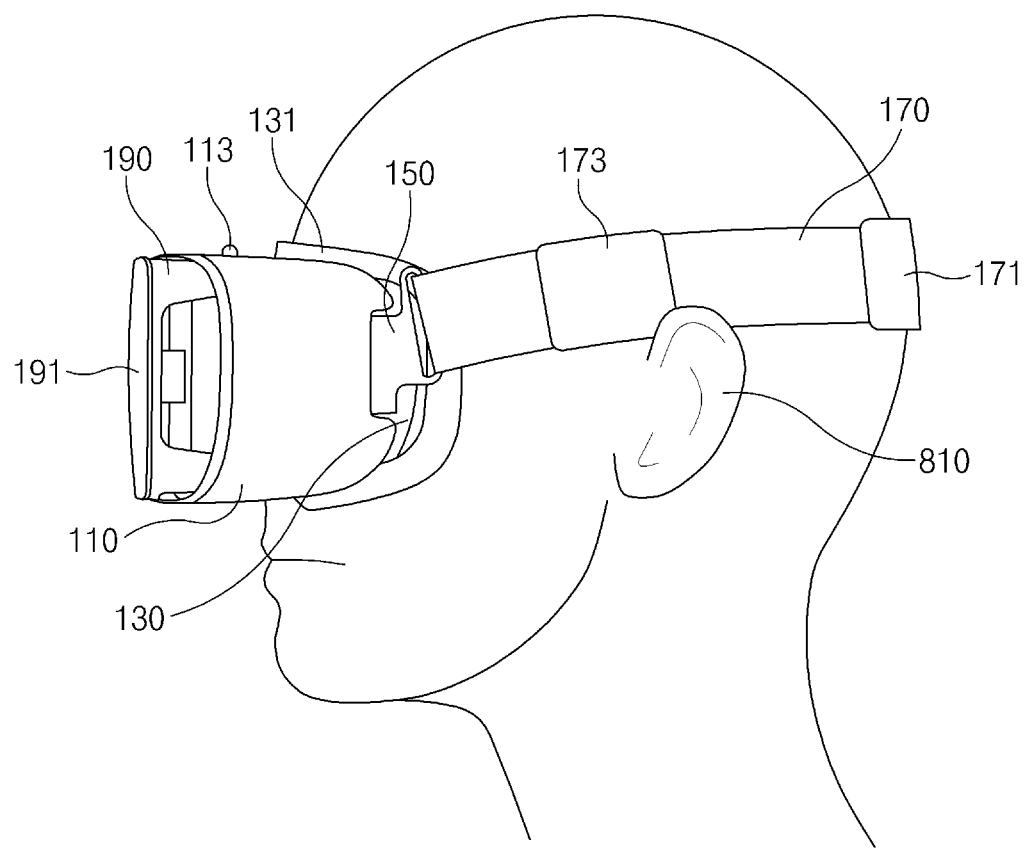
FIG. 8 illustrates a head mounted display device according to an embodiment of the present disclosure.

FIG. 8 illustrates a head mounted display device according to an embodiment of the present disclosure.

Referring to FIG. 8, the head mounted display device 100 may be adhered and mounted on the facial side of the user. The facial side contact part 130 arranged on the rear surface of the main frame 110 may be adhered to the facial side of the user. Further, the resilient body 131 included at a portion of the facial side contact part 130 may provide a comfortable wearing feeling when the user wears the head mounted display device 100. The head mounted display device 100 includes a support part 170 to be supported by the facial side of the user, and the support part 170 is connected to the connecting device 150 arranged on one surface (e.g., a side surface) of the main frame 110.

Because the connecting device 150 is inclined from the rear surface of the main frame 110 towards the upper surface of the main frame 110 by a specific angle, the support part 170 connected to the connecting device 150 may support the head of the user while being inclined towards the upper surface of the main frame 110 by a specific angle. Accordingly, the weight applied to the facial side of the user may be decreased, and the weight biased to a specific portion of the facial side may be dispersed.

Further, because a surface of the hinge 151 from which the extension 153 included in the connecting device 150 extends upwards from a lower end of the hinge 151 towards the upper surface of the main frame 110 by a specific size, the support part 170 may be prevented from being stopped or covered by a specific portion of the user, for example, an ear of the user.

Figure 9A:
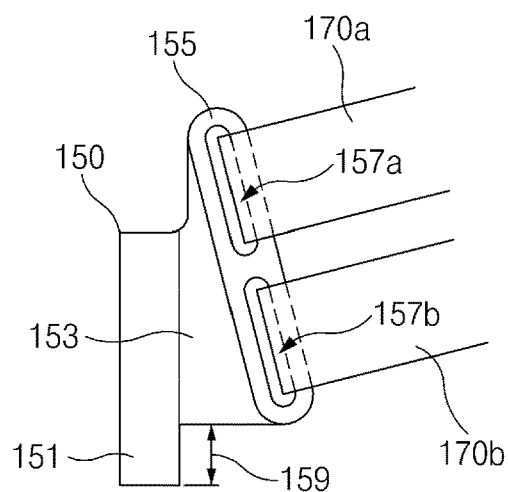
FIG. 9A illustrates a connecting device and a support part included in a head mounted display device according to an embodiment of the present disclosure.
Figure 9B:
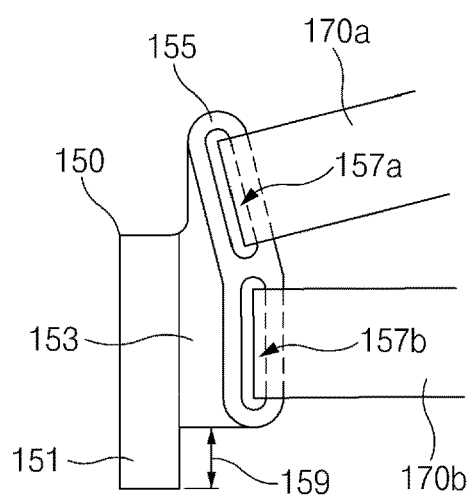
FIG. 9B illustrates a connecting device and a support part included in a head mounted display device according to an embodiment of the present disclosure.
Figure 9C:
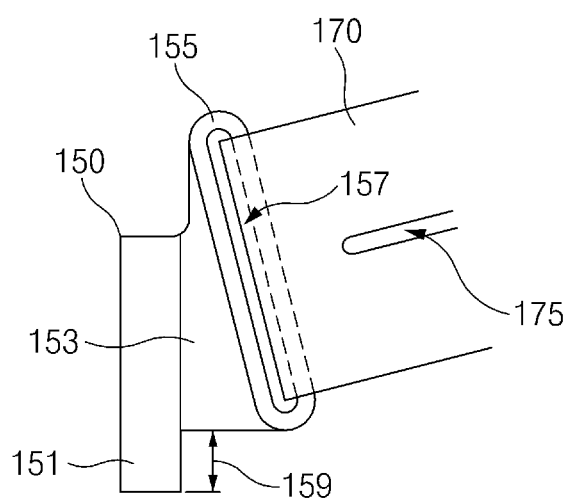
FIG. 9C is a view illustrating another form of a connecting device and a support part included in the head mounted display device according to an embodiment of the present disclosure.

FIGS. 9A to 9C illustrate connecting devices and support parts included in a head mounted display device according to embodiments of the present disclosure.

Referring to FIGS. 9A to 9C, the connecting device 150 and the support part 170 included in the head mounted display device 100 may be provided in various forms. One or more holes 157 formed in the connector 155, and one or more support parts 170 are connected to the holes 157 to correspond to the number of the holes.

Referring to FIG. 9A, the connector 155 of the connecting device 150 may include a first hole 157a and a second hole 157b. The first hole 157a may be formed at an area of an upper end of the connector 155 to have a specific length and a specific width. Further, the second hole 157b may be formed at an area of a lower end of the connector 155 to have a specific length and a specific width. The width and the thickness of the first support part 170a connected to the first hole 157a may correspond to the length and the width of the first hole 157a. Further, the width and the thickness of the second support part 170a connected to the second hole 157a may correspond to the length and the width of the second hole 157b. When the support part 170 includes a first support part 170a and a second support part 170b, a tension that adheres the head mounted display device 100 on the facial side of the user is dispersed so that biasing of the weight applied to the facial side may be prevented.

In FIG. 9B, instead of forming the first hole 157a and the second hole 157b such that the lengthwise directions thereof are the same as illustrated in FIG. 9A, the lengthwise directions of the first hole 157a and the second hole 157b may be different. For example, as illustrated in FIG. 9B, the lengthwise direction of the first hole 157a may form a specific angle with the rear surface of the main frame 110, and the lengthwise direction of the second hole 157b may face the rear surface of the main frame 110. When the lengthwise directions of the first hole 157a and the second hole 157b are different as in FIG. 9B, a tension for adhering the head mounted display device 100 to the facial surface of the user may be dispersed and the first support part 170a and the second support part 170b connected to the first hole 157a and the second hole 157b, respectively, may support different portions of the head, which increases stability.

Alternatively, instead of a plurality of holes 157 being formed in the connector 155 and a plurality of support parts 170 are provided in the plurality of holes 157, the head mounted display device 100 may be configured such that one hole 157 is formed in the connector 155 and the forms of the support part 170 are differently formed. For example, as illustrated in FIG. 9C, a portion of the support part 170, which is connected to the hole 157, may be integrally formed, and at least portion of the support part 170, which is spaced apart from the hole 157, may be divided into a plurality of branches.

Figure 10A:
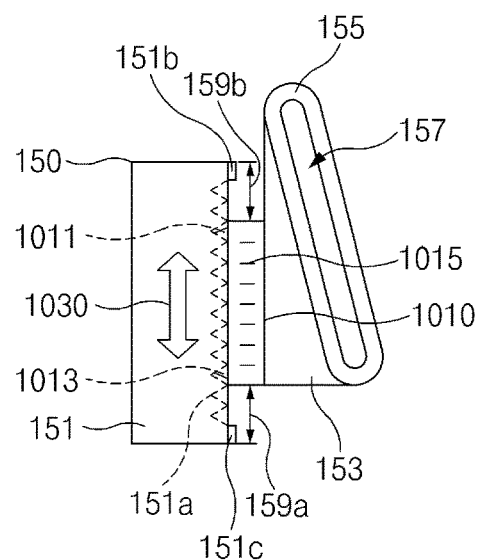
FIG. 10A is a view illustrating a form in which a positioning part is added to a connecting device included in a head mounted display device according to an embodiment of the present disclosure.
Figure 10B:
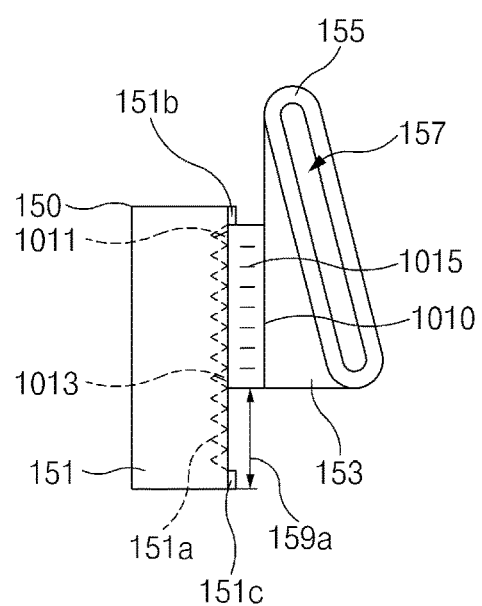
FIG. 10B is a view illustrating a state in which the positioning part of FIG. 10A is moved to an upper end of the connecting device according to an embodiment of the present disclosure.
Figure 10C:
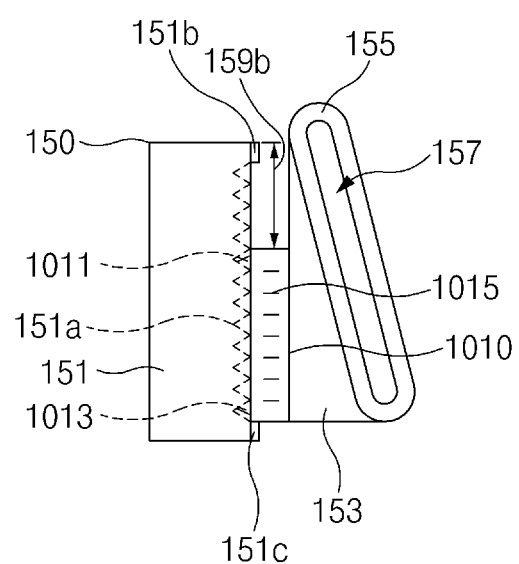
FIG. 10C is a view illustrating a state in which the positioning part of FIG. 10A is moved to a lower end of the connecting device according to an embodiment of the present disclosure.

FIG. 10A illustrates a positioning part added to a connecting device included in a head mounted display device according to an embodiment of the present disclosure, FIG. 10B illustrates the positioning part of FIG. 10A moved to an upper end of the connecting device, and FIG. 10C illustrates the positioning part of FIG. 10A moved to a lower end of the connecting device.

Referring to FIG. 10A, the connecting device 150 includes a positioning part 1010 such that an extension 153 included in the connecting device 150 that may be moved on a surface that extends from the hinge 151. The positioning part 1010 may be arranged between the hinge 151 and the extension 153. The positioning part 1010 may be provided integrally with the extension 153, and may be movably coupled to one surface of the hinge 151 such that the extension 153 may be moved upwards and downwards.

The positioning part 1010 may have protrusions that are seated in one or more grooves 151a formed inside the hinge 151 at opposite ends of a surface of the positioning part 1010, which contacts the hinge 151. For example, the positioning part 1010 has a first protrusion 1011 at an upper end thereof, and has a second protrusion 1013 at a lower end thereof. Surfaces of the first protrusion 1011 and the second protrusion 1013 may have spiral shapes such that the first protrusion 1011 and the second protrusion 1013 may be slid in the grooves 151a formed inside the hinge 151 if a specific force or more is applied. At least one slide preventing part 1015 is formed on at least one surface of the positioning part 1010 such that a finger that contacts the positioning part 1010 during an upward/downward movement operation 1030 of the positioning part 1010 is not slid. FIGS. 10A to 10C illustrate the slide preventing part 1015 having a form of a linear boss.

One or more grooves 151a may be formed inside the hinge 151 such that the protrusions formed in the positioning part 1010 may be seated in the grooves 151a. Further, separation preventing parts (for example, a first separation part 151b and a second separation part 151c) may be formed at opposite ends of a surface of the hinge 151, which contacts the positioning part 1010 such that the positioning part 1010 is not separated from the hinge 151 during an upward and downward movement operation of the positioning part 1010.

As illustrated in FIG. 10B, if the positioning part 1010 is moved upwards by a specific distance, an upper end of the positioning part 1010 is stopped by the first separation preventing part 151b of the hinge 151 such that the positioning part 1010 is not separated from the hinge 151. In this case, the extension 153 may be moved from a lower end of the hinge 151 towards an upper surface of the main frame 110 by a first size 159a.

As illustrated in FIG. 10C, if the positioning part 1010 is moved downwards by a specific distance, a lower end of the positioning part 1010 is stopped by the second separation preventing part 151c of the hinge 151 such that the positioning part 1010 is not separated from the hinge 151. In this case, the extension 153 may be moved from an upper end of the hinge 151 towards a lower surface of the main frame 110 by a second size 159b.

The position of the extension 153 connected to the positioning part 1010 may be changed by changing the position of the positioning part 1010 through the upward and downward movement operation 1030, and the position of the connector 155 connected to the extension 153 also may be changed. Accordingly, the user may adjust the support part 170 connected to the connector 155 by moving the positioning part 1010 such that the support part 170 is not stopped by an ear of the user or does not cover the ear of the user.

As described above, according to various embodiments, a head mounted display device may include a main frame that has one surface formed to face a facial side of a user and an opposite surface on which an external electronic device is mounted, a connecting device that is connected to the main frame, and a support part that is connected to the connecting device such that the main frame is fixed to the facial side of the user, wherein at least a portion of a surface of the connecting device, which is connected to the support part, forms an angle with a direction in which the main frame faces the facial side of the user.

The connecting device may include a hinge that is coupled to the main frame, an extension that extends from at least a portion of one surface of the hinge, and a connector that has one surface connected to the extension and an opposite surface connected to the support part.

The hinge may allow the connecting device to be hinged within a range in a direction perpendicular to a vertical axis of the main frame.

A hinge shaft may be arranged at at least a portion of the main frame in a direction of the vertical axis of the main frame, and at least a portion of one surface of the hinge has a form of a hook so that the hinge is coupled to the hinge shaft.

A surface of the extension, which extends from the hinge, may be situated above a lower end of the hinge towards an upper surface of the main frame by a distance.

The connector may include one or more holes formed to have a length and a width corresponding to a width and a thickness of the support part such that the support part is inserted through in the one or more holes.

The connector may include a first hole formed in an area of an upper end of the connector and a second hole formed in an area of a lower end of the connector, and the support part may include a first support part connected to the first hole and a second support part connected to the second hole.

A length direction of the first hole, which is connected to the first support part, may form the angle with a direction in which the main frame faces the facial side, and a length direction of the second hole, which is connected to the second support part, may be formed perpendicular to a direction in which the main fame faces the facial side of the user.

A portion of the support part, which is connected to the one or more holes, may be provided in an integral form, and at least another portion of the support part, which has a spacing distance from the one or more holes, may be formed to be branched into a plurality of parts.

The connecting device may further include a positioning part that functions to allow the extension to be movable on a surface extending from the hinge.

The positioning part may be arranged between the hinge and the extension.

The positioning part may be provided integrally with the extension and is movably coupled to one surface of the hinge.

The hinge may have at least one groove formed in an area on an inner side of a surface of the hinge, which is in contact with the positioning part, and the positioning part may have at least one protrusion that functions to allow at least a portion of a surface of the positioning part, which is in contact with the hinge, to be seated on the groove.

A surface of the at least one protrusion may be formed a spiral shape.

The hinge may have at least one separation preventing part formed on at least a portion of a surface of the hinge, which is in contact with the positioning part, such that the positioning part is not separated from the hinge when being moved.

The positioning part may have at least one slide preventing part formed on one surface of the positioning part such that a portion of a body of the user, which comes into contact with the positioning part in an operation of moving the positioning part, is not slid.

At least a portion of the support part may be formed of a resilient material.

The support part may include a length adjusting part that functions to adjust a length of the support part.

The length adjusting part may include at least one of a fastener and a magnet.

The support part may further include a support comprising at least one cushion material that functions to support a rear head of the user.

Figure 11:
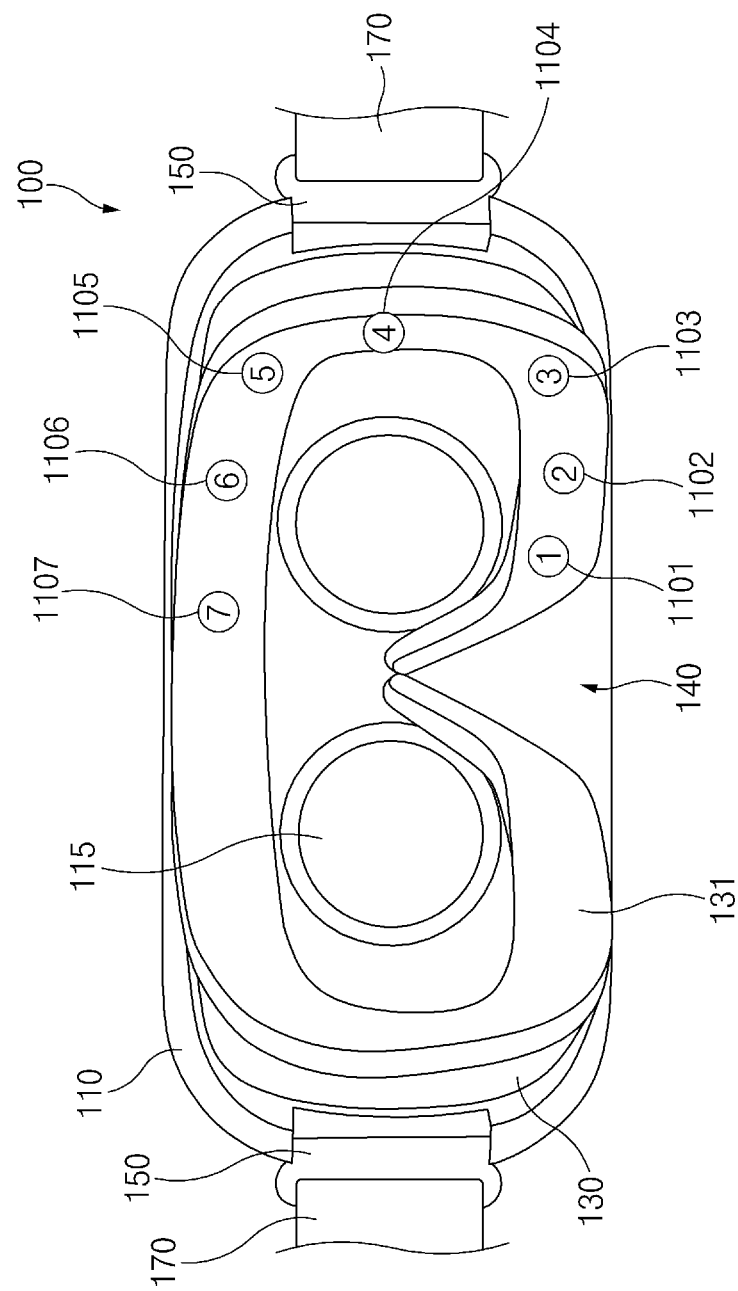
FIG. 11 is a view for explaining weights applied to various portions of the facial side according to an embodiment of the present disclosure.
Figure 12:
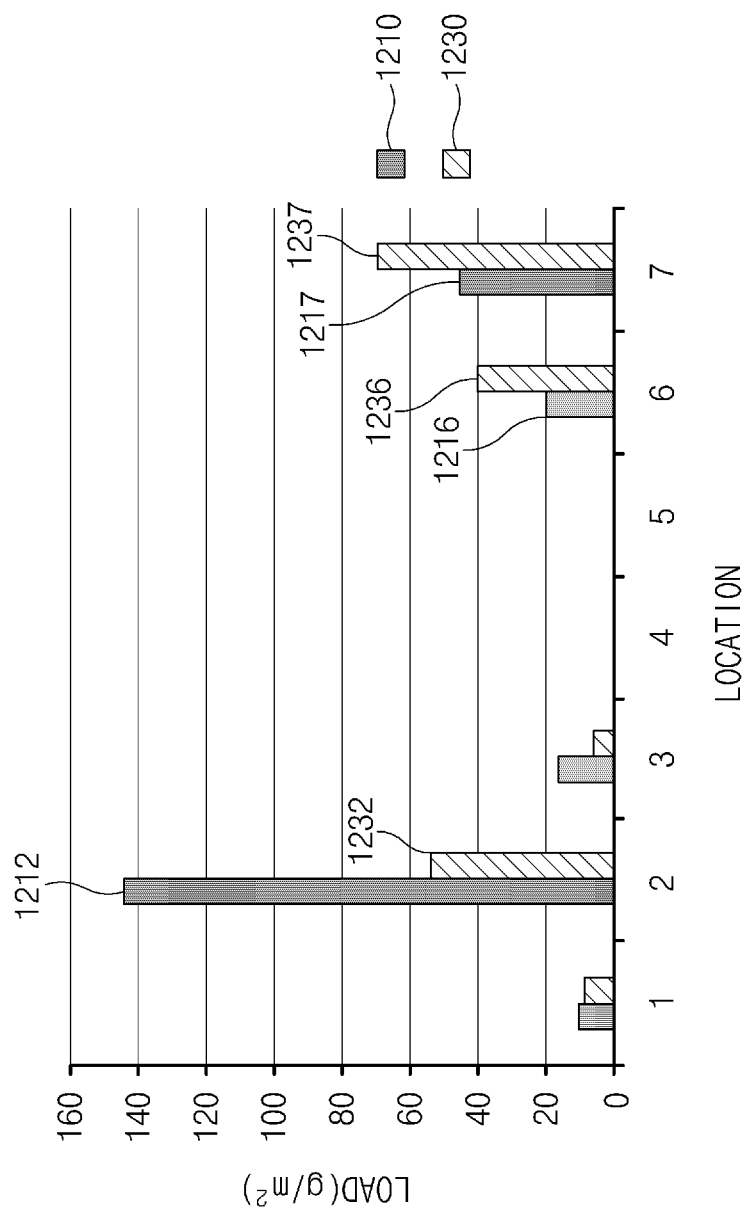
FIG. 12 is a graph depicting weights applied to various portions of the facial side according to an embodiment of the present disclosure.

FIG. 11 is a view for explaining weights applied to various portions of the facial side according to an embodiment, and FIG. 12 is a graph depicting weights applied to various portions of the facial side.

Referring to FIGS. 11 and 12, if the user wears the head mounted display device 100, the facial side contact part 130 arranged on a rear surface of the main frame 110 may contact the facial side of the user. Further, the facial side contact part 130 may be adhered to the facial side of the user through the support part 170 connected to the connecting device 150 provided on a side surface of the main frame 110. Further, when the facial side contact part 130 contacts the facial side of the user, the resilient body 131 arranged at at least a portion of the facial side contact part 130 may provide a comfortable wearing feeling.

If the head mounted display device 100 is mounted, different weights may be applied to various portions of the facial side that contact the facial side contact part 130. For example, weights that are applied to a first point 1101, a second point 1102, and a third point 1103 in contact with the nose or a cheek bone, a fourth point 1104 and a fifth point 1105 in contact with the temple, and a sixth point 1106 and a seventh point 1107 in contact with the forehead or an eyebrow may be different.

In FIG. 12, the first graph 1210 depicts weights for various portions of the facial side, which were measured in a state in which the support part 170 supports the head of the user towards the rear surface of the main frame 110, and the second graph 1230 depicts weights for various portions of the facial side, which were measured in a state in which the support part 170 is inclined from the rear surface of the main frame 110 towards the upper surface of the main frame 110 by a specific angle.

When the support part 170 supports the head of the user towards the rear surface of the main frame 110, it can be seen in the first graph 1210 that a magnitude 1212 of a weight applied to the second point 1102 in contact with the nose or the cheek bone is larger than that of another point. For example, it can be seen that the magnitudes 1216 and 1217 of the weights applied to the sixth point 1106 and the seventh point 1107 in contact with the forehead or the eyebrow is very small.

As shown in the second graph 1230, when the support part 170 supports the head of the user while being inclined from the rear surface of the main frame 110 towards the upper surface of the main frame 110 by a specific angle, the magnitude 1232 of the weight applied to the second point 1102 decreases and the magnitudes 1236 and 1237 of the weights applied to the sixth point 1106 and the seventh point 1107 increase. Accordingly, the weights applied to various portions of the facial side are dispersed. Further, the total sum of the weights applied to the facial side decreases.

Figure 13:
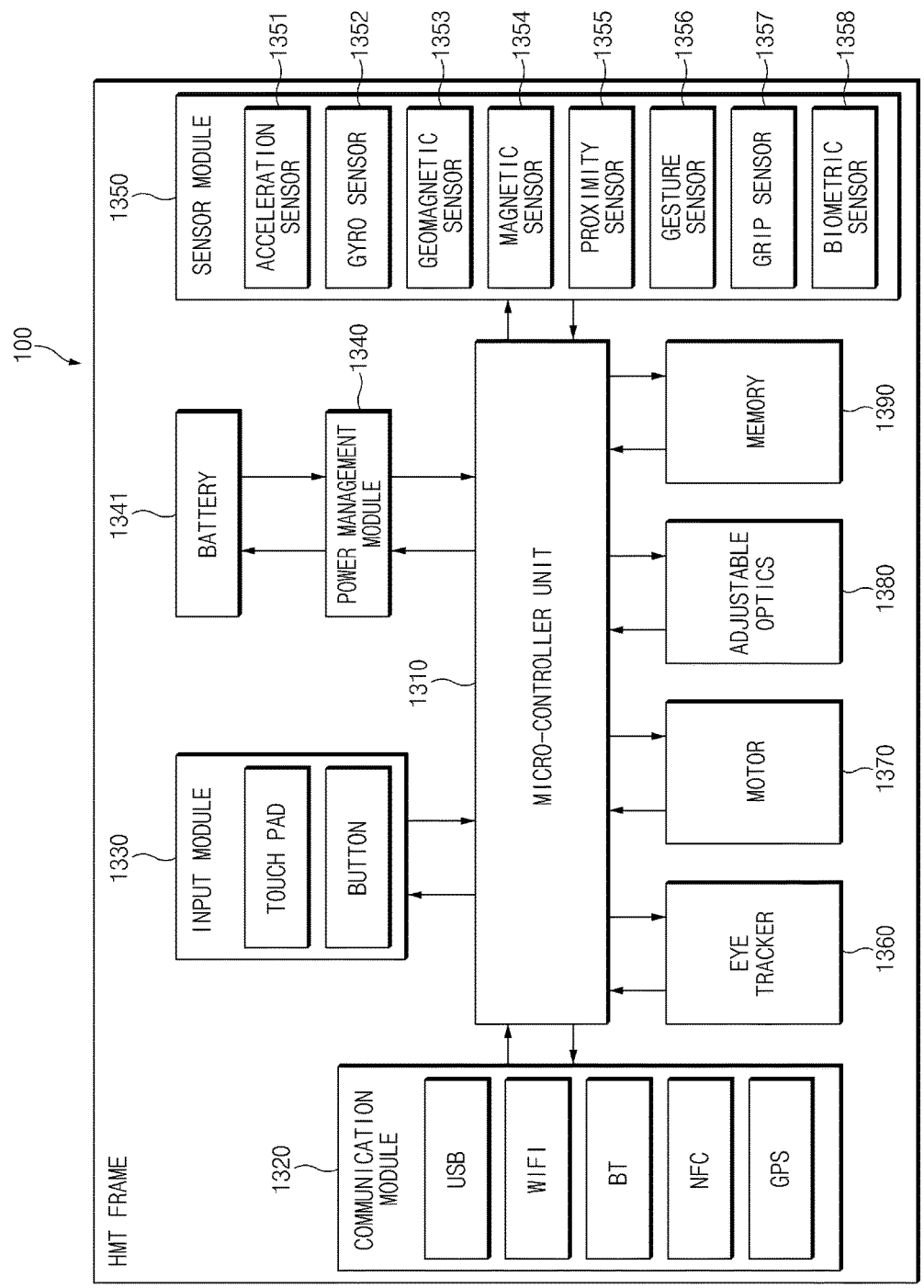
FIG. 13 illustrates head mounted display device according an embodiment of the present disclosure.

FIG. 13 illustrates a configuration of the head mounted display device according an embodiment.

Referring to FIG. 13, the head mounted display device 100 includes a microcontroller unit (MCU) 1310, a communication module 1320, an input device 1330, a power management module 1340, a battery 1341, a sensor module 1350, an eye tracker 1360, a vibrator (or motor) 1370, an adjustable optics (or a lens assembly) 1380, and a memory 1390.

Other elements, for example, a display, are not illustrated in the block diagram for convenience of description. Some of the elements illustrated in FIG. 13 may be included in the main frame 110, and some of the elements may be included in a display device (e.g., a detachable smartphone) of the external electronic device 200.

The MCU 1310 may include a processor, and may drive an operating system (OS) or an embedded software (S/W) program to control a plurality of hardware elements connected to the MCU 1310.

The communication module 1320 may electrically connect the main frame 110 of the head mounted display device 100 and the external electronic device 200, e.g., a smartphone terminal, to transmit and receive data by using a wired and/or wireless communication. The communication module 1320 may include at least one of a USB module, a Wi-Fi module, a Bluetooth (BT) module, a near field communication (NFC) module, and a global positioning system (GPS) module. At least a part (e.g., two or more) of the Wi-Fi module, the BT module, the NFC module, and the GPS module may be included in a single integrated chip (IC) or IC package.

The input device 1330 may include a touch pad or a button. The touch pad may employ at least one of capacitive, resistive, infrared, and ultrasonic sensing methods. The touch pad may further include a control circuit. The touch pad may further include a tactile layer so as to provide a haptic feedback to a user. The button may include a physical button, an optical button, and/or a keypad.

The power management module 1340 may manage power of the head mounted display device 100. The power management module 1340 may include a power management integrated circuit (PMIC), a charger IC, and/or a battery gauge.

The PMIC may employ a wired and/or wireless charging method. The wireless charging method may include a magnetic resonance method, a magnetic induction method, an electromagnetic method, etc. An additional circuit for wireless charging, such as a coil loop, a resonant circuit, a rectifier, or the like, may be further included.

The battery gauge may measure, for example, a remaining capacity of the battery 1341 and a voltage, current or temperature thereof while the battery 1341 is charged.

The battery 1341 may include a rechargeable battery and/or a solar battery.

When the external electronic device 200 is connected to the head mounted display device 100, the power management module 1340 may use a battery included in the external electronic device 200. Further, the power management module 1340 may manage electric power that is supplied from an external power source.

The sensor module 1350 may measure physical quantity or detect an operation state of the head mounted display device 100 so as to convert measured or detected information into an electrical signal. The sensor module 1350 includes an acceleration sensor 1351, a gyro sensor 1352, a geomagnetic sensor 1353, a magnetic sensor 1354, a proximity sensor 1355, a gesture sensor 1356, a grip sensor 1357, and a biometric sensor 1358. A motion of the head of the user who wears the head mounted display device 100 may be detected by using at least one of the acceleration sensor, the gyro sensor, or the geomagnetic sensor. It may be detected whether the head mounted display device 100 is mounted, by using the proximity sensor or the grip sensor.

At least some elements of the sensor module 1350 may be included in the external electronic device 200 that is detachable. The sensor module 1350 may further include an infrared (IR) sensor, a pressure sensor, or a touch sensor to detect whether the user wears the head mounted display device 100 by detecting recognition of an IR ray, recognition of a pressure, a change rate of capacitance (or permittivity).

The gesture sensor may detect a motion of a hand or a finger of the user to receive the motion as an input operation of the head mounted display device 100. Additionally or alternatively, the sensor module 1350 may include an olfactory sensor (E-nose sensor), an electromyography (EMG) sensor, an electroencephalogram (EEG) sensor, an electrocardiogram (ECG) sensor, an iris recognition sensor, and/or a fingerprint sensor. The sensor module 1350 may further include a control circuit for controlling at least one sensor included therein. In some various embodiments of the present disclosure, the head mounted display device 100 may further include a processor configured to control the sensor module 1350 as a part of the MCU 1310 or separately, so that the sensor module 1350 is controlled while the MCU 1310 is in a sleep state.

The eye tracker 1360 may track an eye of the user by using at least one of an electrical oculography sensor, a coil system, a dual Purkinje system, a bright pupil system, and a dark pupil system. Further, the eye tracker 1360 may further include a micro camera for tracking an eye.

The vibrator (or motor) 1370 may convert an electrical signal into a mechanical vibration, and may generate a vibration or haptic effect.

The adjustable optics 1380 may measure an inter-pupil distance (IPD) of the user such that the user may watch an image suitable for his or her eye sight to adjust a distance of the lens and a location of the display of the external electronic device 200.

The memory 1390 may include an internal memory or an external memory. The internal memory may include at least one of a volatile memory (e.g., a dynamic RAM (DRAM), a static RAM (SRAM), a synchronous dynamic RAM (SDRAM), or etc.), a nonvolatile memory (e.g., a one-time programmable ROM (OTPROM), a programmable ROM (PROM), an erasable and programmable ROM (EPROM), an electrically erasable and programmable ROM (EEPROM), a mask ROM, a flash ROM, a flash memory (e.g., a NAND flash memory, a NOR flash memory, etc.)), a hard drive, or a solid state drive (SSD). The external memory may include, for example, a flash drive such as a compact flash (CF), a secure digital (SD), a Micro-SD, a Mini-SD, an extreme digital (xD), a MultiMediaCard (MMC), a memory stick, etc. The external memory may be operatively and/or physically connected to the head mounted display device 100 through various interfaces.

The memory 1390 may store instructions or data related to at least one of the other elements of the head mounted display device 100. The memory 1390 may store software and/or a program. The program may include a kernel, a middleware, an application programming interface (API), and/or an application program (or an application). At least a portion of the kernel, the middleware, or the API may be referred to as an operating system (OS).

The kernel may control or manage system resources (e.g., the MCU 1310, the memory 1390, etc.) used to perform operations or functions of other programs (e.g., the middleware, the API, or the application program). Further, the kernel may provide an interface for allowing the middleware, the API, or the application program to access individual elements of the head mounted display device 100 in order to control or manage the system resources.

The middleware may serve as an intermediary so that the API or the application program communicates and exchanges data with the kernel. Further, the middleware may handle one or more task requests received from the application program according to a priority order. For example, the middleware may assign at least one application program a priority for using the system resources (e.g., the MCU 1310, the memory 1390, etc.) of the head mounted display device 100. For example, the middleware may handle the one or more task requests according to the priority assigned to the at least one application, thereby performing scheduling or load balancing with respect to the one or more task requests.

The API, which is an interface for allowing the application to control a function provided by the kernel or the middleware, may include, for example, at least one interface or function (e.g., instructions) for file control, window control, image processing, character control, or the like.

The application, for example, may include at least one of a short message service/multimedia message service (SMS/MMS) application, an e-mail application, a calendar application, an alarm application, a health care (e.g., measure an exercise amount or blood sugar) application, or an environmental information provision (e.g., provide air pressure, humidity, or temperature information) application. Additionally or alternatively, the application may include an information exchange application for supporting information exchange between the head mounted display device 100 and an external electronic device 200. The information exchange application may include, for example, a notification relay application for relaying specific information to the external electronic device 200 or a device management application for managing the external electronic device 200.

For example, the notification relay application may have a function for relaying, to an external electronic device 200, notification information generated in another application (e.g., the SMS/MMS application, the e-mail application, the health care application, the environmental information application, etc.) of the head mounted display device 100. Further, the notification relay application may receive notification information from the external electronic device 200 and may provide the received notification information to the user.

The device management application, for example, may manage (e.g., install, delete, or update) at least one function (e.g., turn-on/turn off of the external electronic device 200 itself (or some elements) or the brightness (or resolution) adjustment of a display) of the external electronic device 200 communicating with the head mounted display device 100, an application running in the external electronic device 200, or a service (e.g., a call service, a message service, or the like) provided from the external electronic device 200.

Figure 14:
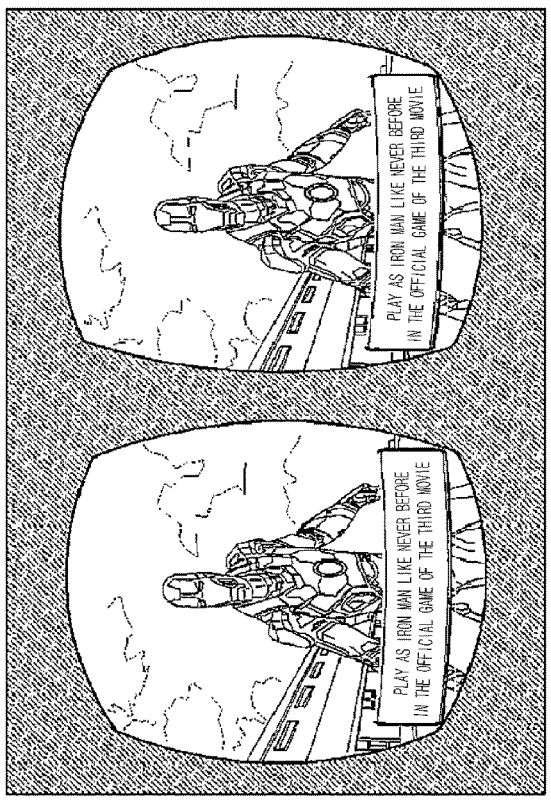
FIG. 14 illustrates a normal mode and a head mounted mode or a virtual reality mode of a head mounted display device according to an embodiment of the present disclosure.
Figure 14:
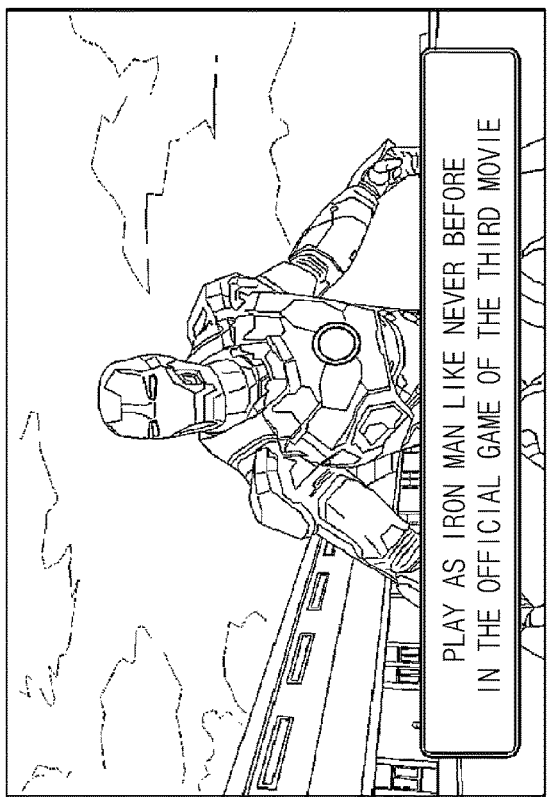

FIG. 14 illustrates a normal mode and a head mounted mode (HMM) or a virtual reality (VR) mode of a head mounted display device according to an embodiment of the present disclosure.

The HMM or VR mode is a mode that provides at least one of a see-through mode of providing an augmented reality (AR) or a see-closed mode of providing a virtual reality (VR) through a display, and for example, when the external electronic device 200 is a smartphone is mounted on the main frame 110 of the head mounted display device 100, a general mode may be converted to the head mounted mode or the VR mode. The HMM or VR mode may be expressed such that one image is separated into two images. According to an embodiment, because the HMM mode or the VR mode may cause distortion of an image by the lens 115 included in the main frame 110, the planar image may be inversely distorted according to the characteristics of the lens 115 to provide an undistorted image to the user.

Figure 15:
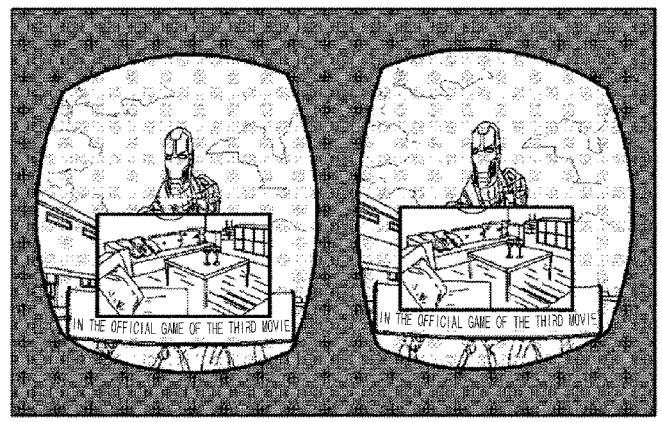
FIG. 15 illustrates a head mounted display device providing a see-through mode by using a rear camera of a smartphone according to an embodiment of the present disclosure.
Figure 15:
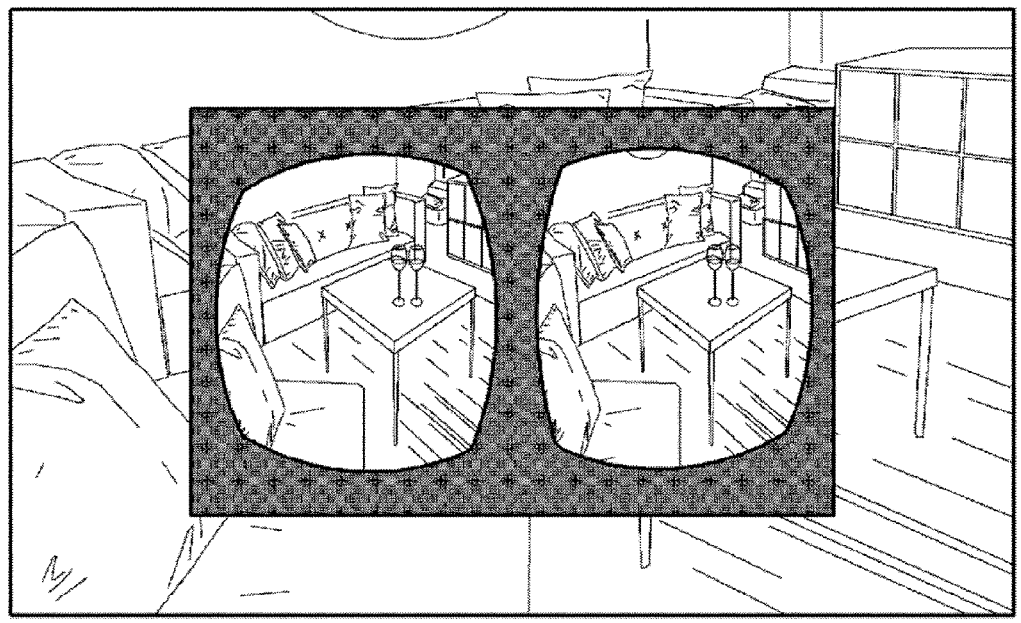

FIG. 15 illustrates a head mounted display device providing a see-through mode by using a rear camera of a smartphone according to an embodiment of the present disclosure.

Referring to FIG. 15, when the external electronic device 200 is a smartphone and is mounted on the main frame 110, the head mounted display device 100 may provide a see-through mode by using a rear camera of the smartphone. To provide a see-through mode, the rear camera of the smartphone may be executed if a see-through mode switching button is pressed. Thereafter, a preview screen of the rear camera may be displayed in an area of an existing VR screen in a picture-to-picture (PIP) form, and a VR screen may be switched to a background and a camera preview screen may be expanded to the entire screen to be shown. Accordingly, the user may identify a surrounding environment through an image, while experiencing an external virtual environment.

Using a head mounted display device 100 according to an embodiment of the present disclosure, a weight applied to the facial side of the user can be dispersed, and thus, the user may be provided with a more comfortable wearing feeling.

Herein, the term "module" may represent a unit of hardware, software, firmware, or a combination thereof. The term "module" may be interchangeably used with the terms "unit", "logic", "logical block", "component" and "circuit". A "module" may be a minimum unit of an integrated component or may be a part thereof, or may be a minimum unit for performing one or more functions or a part thereof.

A "module" may be implemented mechanically or electronically. For example, the "module" may include at least one of an application-specific integrated circuit (ASIC) chip, a field-programmable gate array (FPGA), and a programmable-logic device for performing some operations, which are known or will be developed.

At least a part of devices (e.g., modules or functions thereof) or methods (e.g., operations) according to various embodiments of the present disclosure may be implemented as instructions stored in a computer-readable storage medium in the form of a program module. When the instructions are performed by a processor (e.g., the MCU 1310), the processor may perform functions corresponding to the instructions. The computer-readable storage medium may be, for example, the memory 1390.

A computer-readable recording medium may include a hard disk, a floppy disk, a magnetic medium (e.g., a magnetic tape), an optical medium (e.g., CD-ROM, digital versatile disc (DVD)), a magneto-optical medium (e.g., a floptical disk), or a hardware device (e.g., a ROM, a RAM, a flash memory, etc.). The program instructions may include machine language codes generated by compilers and high-level language codes that can be executed by computers using interpreters. The above-mentioned hardware device may be configured to be operated as one or more software modules for performing operations of various embodiments of the present disclosure and vice versa.

A module or a program module according to various embodiments of the present disclosure may include at least one of the above-mentioned elements, or some elements may be omitted or other additional elements may be added. Operations performed by the module, the program module or other elements according to various embodiments of the present disclosure may be performed in a sequential, parallel, iterative or heuristic way. Furthermore, some operations may be performed in another order or may be omitted, or other operations may be added.

While the present disclosure has been shown and described with reference to certain embodiments thereof, it will be understood by those skilled in the art that various changes in form and details may be made therein without departing from the scope of the present disclosure. Therefore, the scope of the present disclosure should not be defined as being limited to the embodiments, but should be defined by the appended claims and any equivalents thereof.

What is claimed is:

1. A head mounted display device comprising:
    a main frame including surface formed to face a facial side of a user and an opposite surface on which an external electronic device is mounted;
    a connecting device connected to the main frame; and
    a support part connected to the connecting device that fixes the head mounted display device to the facial side of the user,
    wherein the connecting device comprises:
        a first end part connected to the main frame; and
        a second end part extended from and inclined to the first end part and connected to the support part,
    wherein a first line extending from an upper end of the first end part to a lower end of the first end part, and a second line extending from an upper end of the second end part to a lower end of the second end part form a predetermined incline angle.

2. The head mounted display device of claim 1, wherein the first end part comprises a hinge, and
    wherein the connecting device further comprises:
        an extension that extends from at least a portion of a surface of the hinge; and
        a connector including a surface connected to the second end part and an opposite surface connected to the support part.

3. The head mounted display device of claim 2, wherein the hinge allows the connecting device to be hinged within a range in a direction perpendicular to a vertical axis of the main frame.

4. The head mounted display device of claim 3, further comprising a hinge shaft arranged at at least a portion of the main frame in a direction of the vertical axis of the main frame,
    wherein at least a portion of a surface of the hinge is hook-shaped.

5. The head mounted display device of claim 2, wherein a surface of the extension, which extends from the hinge, is situated above a lower end of the hinge towards an upper surface of the main frame by a distance.

6. The head mounted display device of claim 2, wherein the connector comprises a hole having a length and a width corresponding to a width and a thickness of the support part, such that the support part is received through in the hole.

7. The head mounted display device of claim 6, wherein a portion of the support part, which is connected to the hole, is provided in an integral form, and another portion of the support part, which has a spacing distance from the hole, branches into a plurality of parts.

8. The head mounted display device of claim 2, wherein the connector comprises a first hole formed in an area of an upper end of the connector and a second hole formed in an area of a lower end of the connector, and the support part comprises a first support part received in the first hole and a second support part received in the second hole.

9. The head mounted display device of claim 8, wherein a length direction of the first hole forms an angle with a direction in which the main frame faces the facial side of the user, and a length direction of the second hole is formed perpendicular to a direction in which the main fame faces the facial side of the user.

10. The head mounted display device of claim 2, wherein the connecting device further comprises a positioning part that moves the extension on a surface extending from the hinge.

11. The head mounted display device of claim 10, wherein the positioning part is arranged between the hinge and the extension.

12. The head mounted display device of claim 11, wherein the positioning part is provided integrally with the extension and is movably coupled to the surface of the hinge.

13. The head mounted display device of claim 12, wherein the hinge comprises at least one groove formed in an area on an inner side of the surface of the hinge, which is in contact with the positioning part, and the positioning part has at least one protrusion that functions to allow at least a portion of a surface of the positioning part, which is in contact with the hinge, to be seated on the at least one groove.

14. The head mounted display device of claim 13, wherein a surface of the at least one protrusion is formed a spiral shape.

15. The head mounted display device of claim 10, wherein the hinge comprises at least one separation preventing part formed on at least a portion of the surface of the hinge, which is in contact with the positioning part, such that the positioning part is not separated from the hinge when being moved.

16. The head mounted display device of claim 10, wherein the positioning part has at least one slide preventing part formed on one surface of the positioning part such that a portion of a body of the user, which comes into contact with the positioning part in an operation of moving the positioning part, is not slid.

17. The head mounted display device of claim 1, wherein at least a portion of the support part is formed of a resilient material.

18. The head mounted display device of claim 1, wherein the support part comprises a length adjusting part that adjusts a length of the support part.

19. The head mounted display device of claim 18, wherein the length adjusting part comprises at least one of a fastener and a magnet.

20. The head mounted display device of claim 1, wherein the support part further comprises a support including at least one cushion material that supports a rear portion of a head of the user.

* * * * *